Figure 1:
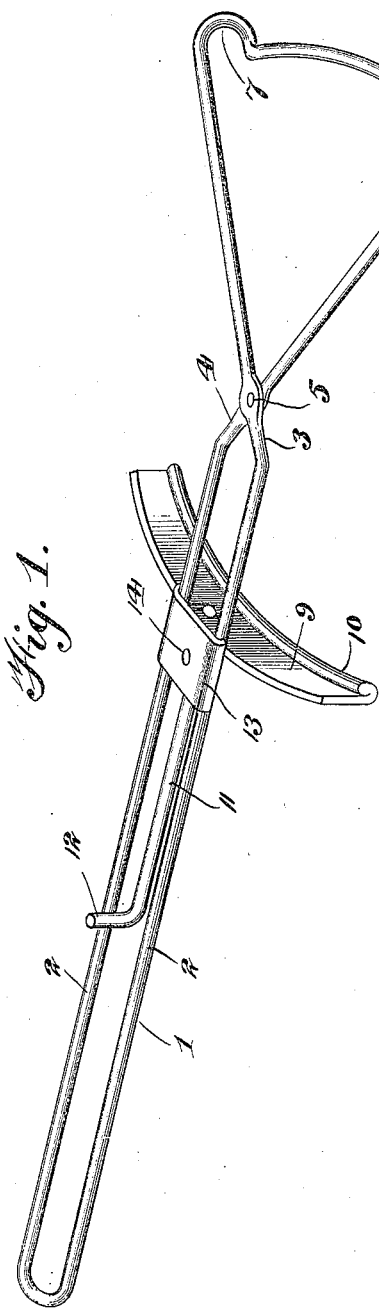

E. HOLLEY.
PLATE OR PAN LIFTER.
APPLICATION FILED NOV. 21, 1916.

1,295,317.

Patented Feb. 25, 1919.

Inventor
Everett Holley.

Witnesses
H. Windridge

By Victor J. Evans
Attorney

UNITED STATES PATENT OFFICE.

EVERETT HOLLEY, OF WALTON, NEW YORK.

PLATE OR PAN LIFTER.

1,295,317.      Specification of Letters Patent.      Patented Feb. 25, 1919.

Application filed November 21, 1916. Serial No. 132,662.

*To all whom it may concern:*

Be it known that I, EVERETT HOLLEY, a citizen of the United States, residing at Walton, in the county of Delaware and State of New York, have invented new and useful Improvements in Plate or Pan Lifters, of which the following is a specification.

This invention relates to a lifting device for plates or pans, and the object of the invention is to produce a device of this character which is primarily adapted for gripping and holding heated plates or pans whereby the same can be conveyed from one place to another without danger of injury to the operator, which shall be of an extremely simple, cheap and effective construction and which will readily and effectively grip the plate or pan to hold the same but which also may be easily released from such gripping engagement.

With the above and other objects in view the improvement resides in the construction, combination and arrangement of parts set forth in the following specification and falling within the scope of the appended claims.

Figure 2:
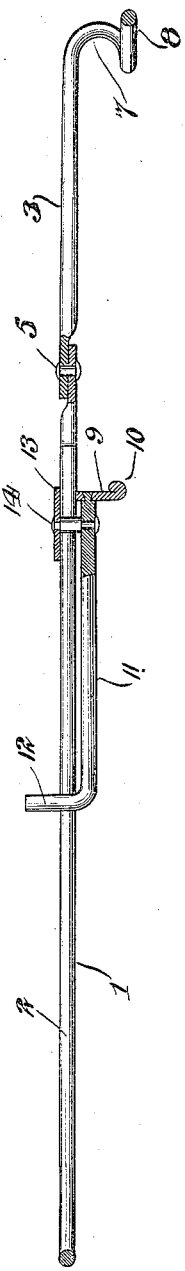

In the drawing:

Figure 1 is a perspective view of a device constructed in accordance with the present invention, and Fig. 2 is a central vertical longitudinal sectional view through the same.

In constructing a plate or pan lifter, in accordance with my invention, I provide a handle 1 which is preferably constructed from a single strand of wire bent upon itself to provide two parallel arms 2—2 which arms at a suitable distance from their outer or connected ends are bent angularly one over the other, as indicated by the numerals 3 and 4, the overlying portion 3 being secured to the underlying angular portion 4, as at 5. The angular extensions 3 and 4 terminate each an equal distance from the pivot 5 and have their ends looped inwardly with respect to the said portions 3 and 4, as indicated by the numerals 6 and 7, and these looped ends are connected to an arched or arcuate member 8 which, in connection with the loops 6 and 7, provides the head or lip for the device.

The clamping member of the structure includes a segmental plate 9 provided at its lower or outer edge and upon its face opposite the curved lip 8, with a continuous bead or rib 10. Centrally connected with the segmental member 9 and extending outwardly therefrom is a rod 11 which has its ends upturned, as at 12, the said rod and its upturned end being disposed centrally between the arms 2 of the handle 1. The numeral 13 designates a spring plate which is arranged transversely over the arms 2 of the handle and which is centrally secured, as at 14, to the rod 11. This spring plate, exerting a tension upon one of the sides of the arms of the handle will force one of the edges of the segmental member of the clamp into contact with the opposite edges or faces of the said members of the handle and as a consequence a pressure between the clamp and handle is at all times maintained so that when the clamp is moved toward or away from the lip 8 by a pressure upon the upturned end or finger 12 of the said rod, the clamping member will be automatically sustained at such adjustment.

The device it will be noted is of a simple construction and as the operation of the same will, it is thought, be perfectly apparent to those skilled in the art to which such invention appertains a further detailed description of the device is not deemed necessary.

Having thus described the invention, what I claim is:

In a device for the purpose set forth, a handle constructed of a single strand of wire to include two parallel arms which cross each other adjacent to one of the ends thereof and which are connected to the lapping portions thereof, said angular extensions being looped inward at their ends and the connecting elements between said looped member being arched, a segmental plate having its lower edge provided with an inturned bead disposed below the parallel members of the handle, a rod having an angle end secured to the said plate whereby the said rod is disposed between the arms of the handle and the angle end thereof provided between the said arms, and a spring plate disposed over the segmental plate and the parallel arms of the handle and connected with the rod, and said spring plate designed to exert a tension between the rod and the segmental plate to force the outer edge of the said segmental plate in frictional engagement with the parallel arms of the handle.

In testimony whereof I affix my signature.

EVERETT HOLLEY.

Copies of this patent may be obtained for five cents each, by addressing the "Commissioner of Patents, Washington, D. C."